(12) United States Patent
Di Serio

(10) Patent No.: US 9,789,532 B2
(45) Date of Patent: Oct. 17, 2017

(54) SUSPENSION ARM FOR MOTOR VEHICLE AND METHOD OF MANUFACTURE THEREOF

(71) Applicant: SAINT JEAN INDUSTRIES, Saint Jean d'ardieres (FR)

(72) Inventor: Emile Thomas Di Serio, Chenas (FR)

(73) Assignee: SAINT JEAN INDUSTRIES, Saint Jean d'Ardieres (FR)

( * ) Notice: Subject to any disclaimer, the term of this patent is extended or adjusted under 35 U.S.C. 154(b) by 61 days.

(21) Appl. No.: 14/416,080

(22) PCT Filed: Jul. 25, 2013

(86) PCT No.: PCT/FR2013/051789
§ 371 (c)(1),
(2) Date: Jan. 21, 2015

(87) PCT Pub. No.: WO2014/016519
PCT Pub. Date: Jan. 30, 2014

(65) Prior Publication Data
US 2015/0190862 A1    Jul. 9, 2015

(30) Foreign Application Priority Data

Jul. 26, 2012 (FR) ...................................... 12 57262

(51) Int. Cl.
| | |
|---|---|
| *B60G 3/04* | (2006.01) |
| *B60G 7/00* | (2006.01) |
| *B23P 17/00* | (2006.01) |
| *B23P 25/00* | (2006.01) |
| *B21D 47/00* | (2006.01) |
| *B21D 53/88* | (2006.01) |
| *B21K 7/12* | (2006.01) |

(52) U.S. Cl.
CPC ................ *B21K 7/12* (2013.01); *B60G 7/001* (2013.01); *B60G 2206/0122* (2013.01);
(Continued)

(58) Field of Classification Search
CPC ............ B60G 2206/00–2206/99; B60G 7/001; B60G 2206/0122; B60G 2206/8101;
(Continued)

(56) References Cited

U.S. PATENT DOCUMENTS 5,607,177 A * 3/1997 Kato ........................ B60G 3/06
188/377
6,360,441 B1 * 3/2002 Himsl ..................... B60R 19/18
29/897.2
(Continued)

FOREIGN PATENT DOCUMENTS

| DE | 10217209 A1 | 11/2003 |
|---|---|---|
| EP | 119365 A1 | 9/1984 |
| KR | 20120030852 A | 3/2012 |

OTHER PUBLICATIONS

International Search Report for PCT/FR2013/051789 dated Oct. 2, 2013.

*Primary Examiner* — Sarang Afzali
*Assistant Examiner* — Darrell C Ford
(74) *Attorney, Agent, or Firm* — Heslin Rothenberg Farley & Mesiti P.C.

(57) ABSTRACT

On at least one surface of a structural part, on all or part of a hollow section between outer and inner peripheral borders, is associated at least one cover sheet made of rigid metallic material. The at least one cover sheet is mechanically fixed with the edge of the peripheral borders of the structural part, and covers all or part of inner cavities formed on open sides of the part. The at least one cover sheet has a triple function: to increase the rigidity of the structural part, to absorb shock by deforming in a plane while remaining integral with the part, and to allow reduction of the mass of the structural part and optimization of the mass/performance ratio.

6 Claims, 2 Drawing Sheets

Figure 1:
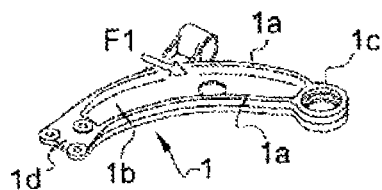

(52) U.S. Cl.
CPC .. *B60G 2206/122* (2013.01); *B60G 2206/162* (2013.01); *B60G 2206/8101* (2013.01); *B60G 2206/81022* (2013.01); *Y10T 29/49622* (2015.01); *Y10T 428/12* (2015.01)

(58) Field of Classification Search
CPC .... B60G 2206/122; B60G 2206/81022; B60G 2206/162; B21K 7/12; Y10T 29/49622; Y10T 428/12
USPC .......... 29/897, 897.2, DIG. 18, 527.1, 527.5, 29/527.7; 280/124.134; 416/897, 897.2, 416/DIG. 18, 527.1, 527.5, 527.7
See application file for complete search history.

(56) References Cited

U.S. PATENT DOCUMENTS

| | | | |
|---|---|---|---|
| 7,575,244 B2 * | 8/2009 | Howell | B60G 7/001 280/124.134 |
| 7,703,783 B2 * | 4/2010 | Miyawaki | B60G 7/02 280/124.134 |
| 8,690,176 B2 * | 4/2014 | Perry | B21D 53/88 280/124.134 |
| 9,561,699 B2 * | 2/2017 | Haselhorst | B60G 3/06 |
| 9,567,013 B2 * | 2/2017 | Ehrlich | B62D 27/02 |
| 9,616,725 B2 * | 4/2017 | Kuroda | B60G 7/001 |
| 2007/0180697 A1 * | 8/2007 | Knaup | B21D 22/02 29/897.2 |
| 2008/0007022 A1 * | 1/2008 | Jones | B60G 3/10 280/124.13 |
| 2012/0021241 A1 * | 1/2012 | Perry | B21D 53/88 428/594 |
| 2016/0263956 A1 * | 9/2016 | Suzumori | B60G 7/001 |
| 2016/0272026 A1 * | 9/2016 | Mark | B60K 5/1241 |
| 2016/0272029 A1 * | 9/2016 | Anderson | B60G 15/062 |
| 2016/0280269 A1 * | 9/2016 | Uicker | B23K 20/129 |
| 2017/0001489 A1 * | 1/2017 | Mosteiro Goyoaga | B23P 15/00 |
| 2017/0057313 A1 * | 3/2017 | Paulsen | B33Y 10/00 |

\* cited by examiner

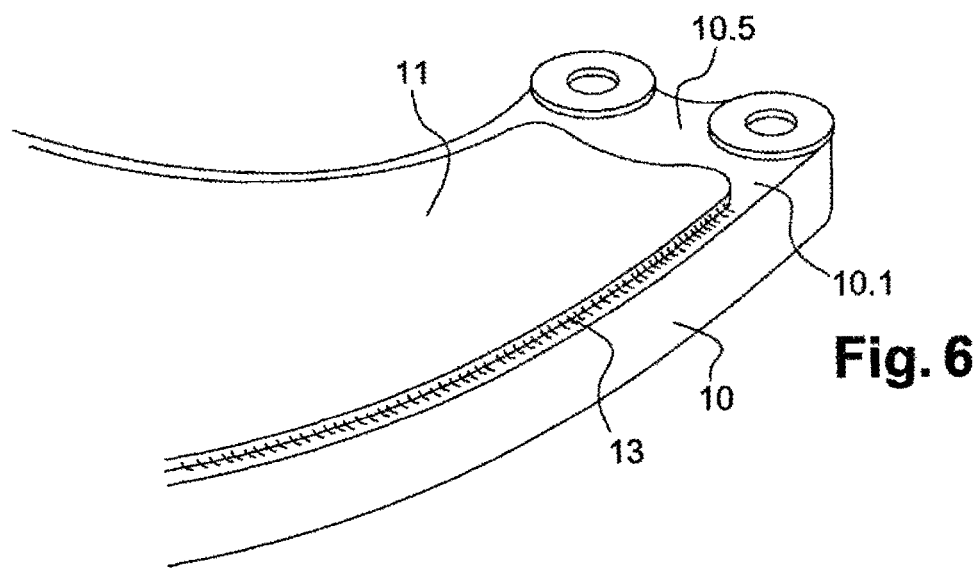
Fig. 6
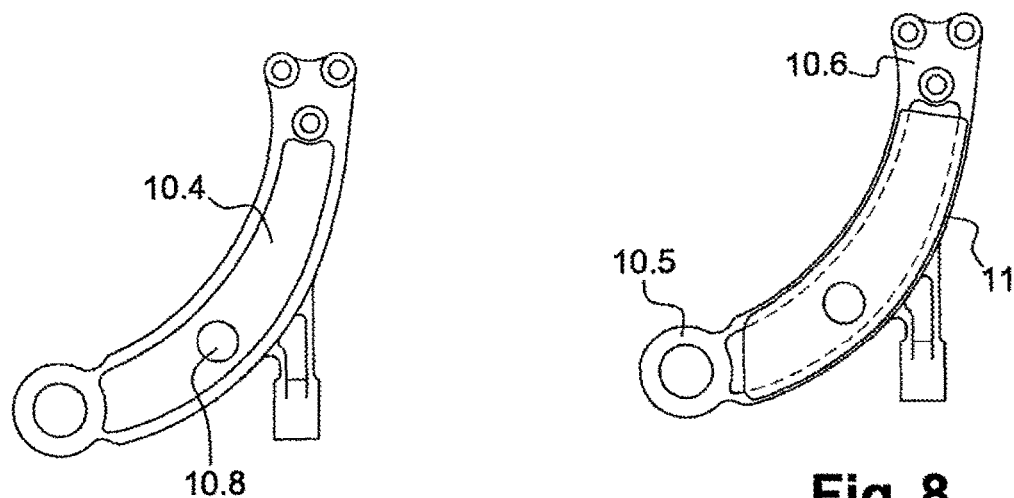
Fig. 7
Fig. 8
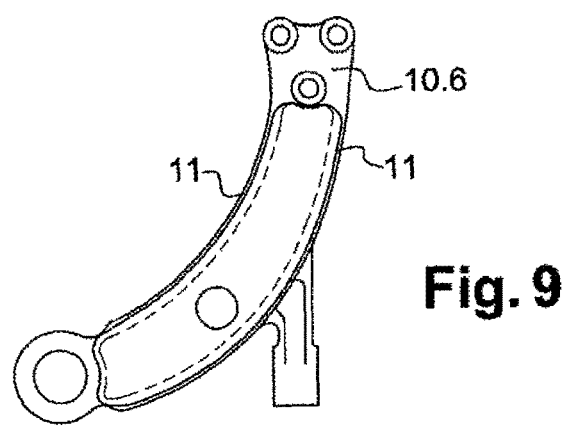
Fig. 9

SUSPENSION ARM FOR MOTOR VEHICLE AND METHOD OF MANUFACTURE THEREOF

CROSS REFERENCE TO RELATED APPLICATIONS

This application is the U.S. National Filing of PCT Application No. PCT/FR2013/051789 filed on Jul. 25, 2013 and published in French as WO 2014/016519 A1 on Jan. 30, 2014, and claims priority of French patent application number 1257262 filed on Jul. 26, 2012, the entire disclosure of these applications being hereby incorporated herein by reference.

BACKGROUND ART

The invention relates to automotive structural parts such as suspension arms, pivots and other similar parts.

The invention also relates to the technical field of casting or forging materials into light alloys of aluminium and similar types as well as to the technical sector combining operations of casting and forging.

The invention more specifically relates to the manufacture of automotive structural parts that meet highly particular specifications with regard to the functionality of the said structural parts considered. These are in fact subject to very strict technical and environmental stresses and constraints in respect of their applications in the fields of motor vehicles, heavy vehicles and other similar vehicles. The specifications are intended for example for resistance to stresses caused by endurance, crashes, buckling and quality requirement levels of welds. The stresses of these structural parts, in the particular case of vehicles, are also accentuated by soil conditions, vehicle rolling, speed thereof with an increase in vibrations. In case of a vehicle crash, these parts are often very easily damaged by inertia effects encountered with deformations or simply, cracks.

To meet these specifications, manufacturers, mainly companies specialising in casting and/or forging, will search for specific forms of these structural parts that are highly resistant to shocks and more generally loads. Thus, and in well-known manner, the structural parts have a cross section determined as 'H' the generator of which follows a direction perpendicular to the direction(s) of the stresses.

Figure 2:
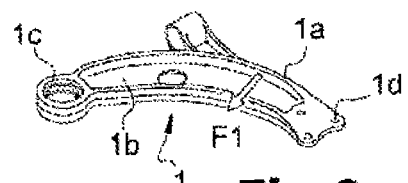

We have thus shown in FIGS. 1 and 2 an example of a structural part of the suspension arm type which according to the prior art has an 'H' section.

We have thus shown part (1) on the front side and back side with the arrow (F1) illustrating the direction of the highest stresses.

It should be noted that this said part (1) is obtained either, by a single casting and/or forging process with the acquisition of the final desired shape directly, or by the implementation of a process referred to by the trademark COBPRESS combining two successive operations of casting followed by forging. This was described in the EP 119365 patent developed and operated by the Applicant since 1983.

The configuration of part (1) thus helps to define stiffening edges (1a) that are more or less high depending on the applications. Cavities (1b) that have no specific function are thus formed on either side of the longitudinal median plane of part (1). The ends (1c) (1d) of the part are arranged in a known and variable manner with the sleeves or fastening rings, and with fastening parts.

The optimisation of these geometries in section 'H' helps to provide parts with better mass/performance ratio. In addition we know, according to basic concepts of solid mechanics that at equal mass, a tube provides more stiffness than a rod of complete cross-section.

The search for manufacturers of this type of structural parts is thus to design structural parts having hollow sections or areas for which the inertias are remote from the neutral axis in order to optimise the quadratic time, an improvement in the performance as regards resistance to stresses while minimising the mass of the part as much as possible.

This search for optimisation of the forms of the structural part must however take into account the above-mentioned technical and environmental stresses and constraints by ensuring excellent rigidity of the part while reducing its mass. In other words, the problem was to meet the paradoxical and contradictory requirements of lightness and rigidity of the part, without adding material.

The solution provided by the Applicant fully meets the above requirements, both in the context of the structural parts obtained by casting, and a joint process of casting and forging known under the trademark COBAPRESS and the object of the patent EP 119365.

From the patent KR 2012 0030852, we also know the manufacturing of suspension parts for motor vehicles that are present on the outer surface of a solid body of related exposed stiffening parts in order to limit or eliminate the effects of ruptures with regard to the end fastening portions of the suspension part.

From the patent DE 10217209, we know the creation of the arm from light alloy arm for a wheel suspension of the motor vehicle. In practice, according to this document the arm consists of the addition of two parallel plates which are fixed on the end parts (5 and 11) by defining a hollow interior volume. The manufacture of such an assembly is complex with many operations to ensure the connection between the parts.

Furthermore, this document describes parts in complex forms and with reduced sections that cannot be easily obtained by a casting process using light cast-iron alloys with high mechanical properties.

None of these documents implement the manufacture of a single piece obtained by a process of forging or casting.

BRIEF SUMMARY OF THE INVENTION

According to a first feature of the invention, the manufacturing method of hollow structural parts obtained at least by a casting and/or forging operation, the said parts having an open cross-sectional profile not limited to type H or U is remarkable in that we associate on at least one surface of the structural part on all or part of its apparent hollow section between its outer and inner peripheral borders at least one cover sheet made using rigid metallic material, and in that we mechanically fix the said cover sheet(s) thus associated with the edge of said peripheral borders part of the structural part, and in that the cover sheet(s) covering all or part of the inner cavities formed on the open sides of the said part and in that the or the cover sheet(s) have a triple function, to increase the rigidity of the structural part, to absorb the shock by deforming in their plane while remaining integral with the said part and to allow the reduction of the mass of the structural part and allow the optimization of the mass/performance ratio.

These and other features will become apparent from the following description.

BRIEF DESCRIPTION OF THE DRAWING FIGURES

Figure 3:
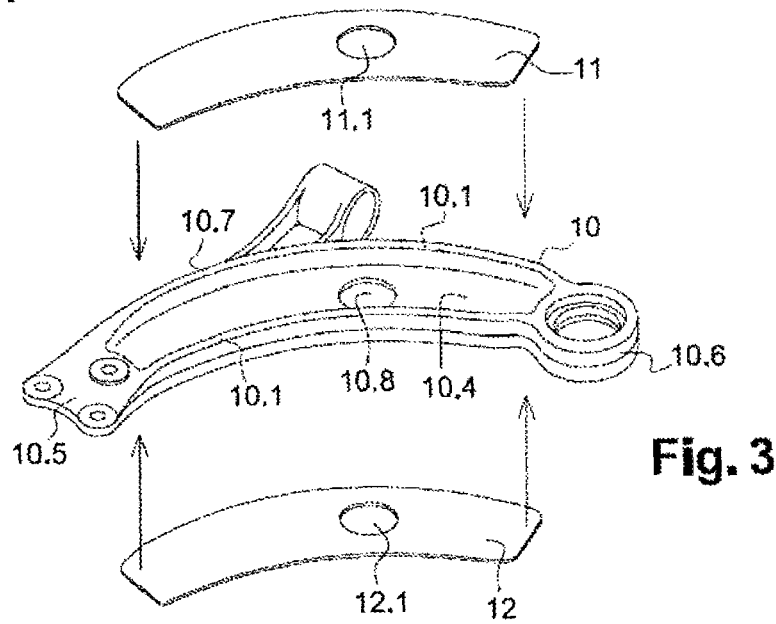
Figure 4:
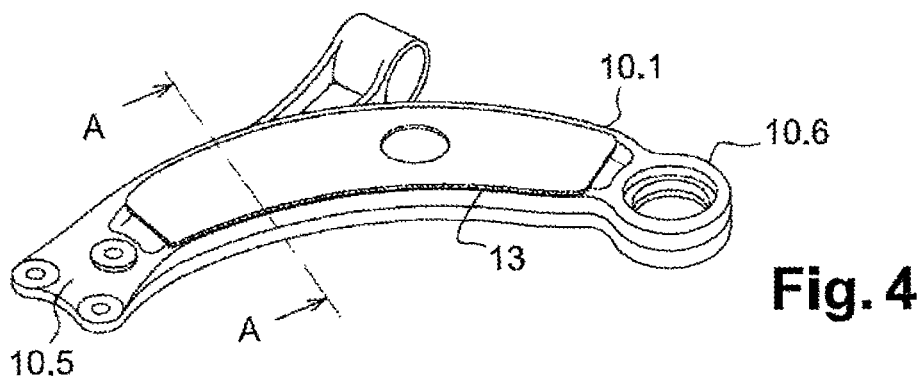
Figure 5:
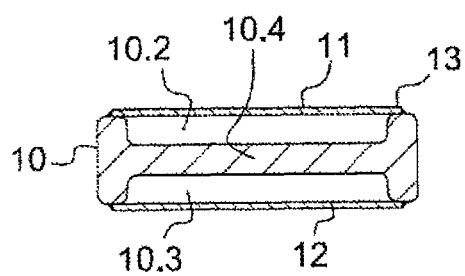

The object of the invention is illustrated without limitation in the figures of the drawings wherein:

FIGS. 1 and 2 are top views of a sample of structural parts according to the prior art with the identification of the stress zones by the arrow (F1), FIG. 3 is a pre-assembly perspective view of a structural part used according to the invention before receiving and securing the cover sheets, in an installation example with an 'H' section, FIG. 4 is a view of the structural part according to FIG. 3 after assembly and fixing of the cover sheet, FIG. 5 is a cross-sectional view as per line AA of FIG. 4, FIG. 6 is a partial and perspective view of a form that is complex and different from that of the structural part shown in FIG. 3, FIGS. 7, 8 and 9 are top views of the structural part according to FIG. 6 respectively, followed by partial covering by the cover sheet, and then by full covering by the said cover sheet.

DETAILED DESCRIPTION

In order to make the object of the invention more concrete, it is now described in a non-exhaustive manner illustrated in the drawing figures.

The invention relates to the design and manufacture of hollow structural parts, including ground connection, which are used for example and without limitation as components for motor vehicles, heavy trucks and other vehicles of this type.

These hollow structural parts include for example suspension arms, pivots, rods, wishbones non-exhaustively and are subject to very high technical and environmental stresses. These parts (10) are formed by casting, forging or obtained in accordance with the combined COBAPRESS™ method of foundry casting followed by forging according to the information provided by the aforementioned European patent. Their configuration and profile is open (transverse) and not limited to the U type or H type for example, with peripheral edges (10.1), one or more hollow inner or cavities (10.2) (10.3), for example on either side of their median connection mass (10.4) in case of an 'H' section. The ends (10.5) (10.6) are arranged according to requirements and the applications with fixing areas of the rings or sleeves.

According to the invention, the hollow structural part (10) receives on its surface(s) comprising the opening(s), on the front and/or back sides, one or more cover sheet(s) (11-12) which have a profile additional to that of the structural part to be positioned and fixed on the edge or top surface (10.7) of each of the inner and outer peripheral borders of the structural part by superimposing. The cover sheet(s) (11-12) thus cover all or part of the inner cavities formed on the open surfaces (front and back) of the structural part.

We have thus shown a partial covering in FIGS. 4 and 8, and a full covering in FIG. 9.

Depending on the configuration of the hollow structural part and its application, it can have one or more openings (10.8) for specific functionalities, and in this case, or the plate(s) will have one or more openings (11.1) (12.1) as required to be in line.

The hollow structural part is favourably made of metallic material, and more particularly of aluminium alloy.

The cover sheet(s) (11-12) are made of metallic material compatible with the material of the structural part in order to be positioned and fixed using any method of assembly: welding, screwing, gluing, riveting, brazing, etc. and to ensure a mechanical connection by a means (13). They are, for example, flat or preformed sheets. For example, weld beads (13) are thus installed on the edge of the peripheral borders of the structural part, or are determined according to the profile of the structural part.

According to another embodiment of the invention, the cover sheet(s) may be in one or more parts leaving spaces between them. The positioning of the said sheet(s) is determined by the manufacturer taking into account the specificities of the connecting plate and performance required for the part.

Favourably, the invention leaves a wide adaptability with more or less complex profiles of the receiving structural part.

The cover sheets (11-12) are firmly attached and welded to the structural part. These sheets have three functions, namely:

They can increase the rigidity of the structural part,

They help to absorb shocks inherent to the unusual and/or accidental stresses by deforming in their plane while remaining integral to the part until the structural area breaks, They also allow optimization of the mass/performance ratio.

The manufacturing method of hollow structural parts obtained at least by a casting, forging or a casting-forging hybrid operation, the said parts having an open cross-sectional profile is remarkable in that we associate on at least one surface of the structural part on all or part of its apparent hollow section between its outer and inner peripheral borders at least one cover sheet made using rigid metallic material, and in that we mechanically fix the said cover sheet(s) thus associated with the edge of said peripheral borders part of the structural part; the said cover sheet(s) ensure stiffening of the structural part and absorbs shocks by deforming in their plane.

The advantages are apparent from the invention and firstly highlight the innovative nature of this production, its relative simplicity of creation as it is also necessary to fully manage the connection between the structural part and the cover sheets. It emphasizes the optimization of the mass/performance ratio.

Thus the solution developed and implemented by this invention presents a single part obtained by casting and/or forging, which can be carried out by means of the COBAPRESS™ method specified above, using light cast-iron alloys with mechanical characteristics and that comprises zones in order to receive a sheet increasing the stiffness. This solution allows the simultaneous casting of all the functional areas of the part by engaging the least amount of material necessary that is then stiffened by the addition of a sheet.

The documents of the prior art do not meet this problem and do not suggest the solution of the invention.

The invention claimed is:

1. A method of manufacturing a hollow assembly of a structural part and at least one planar cover sheet, the structural part comprising a longitudinally extending mass having an open cross-sectional profile not limited to type H or U, comprising: obtaining the structural part by at least one of a casting operation and a forging operation, associating on at least one open side surface of the mass on all or part of a hollow inner cavity between peripheral borders at least one planar cover sheet made of rigid metallic material, the peripheral borders consisting of upright walls extending transversely from a central portion of said mass, the upright walls each defining a wall thickness having a top surface, and mechanically fixing the at least one planar cover sheet on the top surface of the upright walls of said peripheral borders of the mass, wherein the at least one planar cover sheet covers all or part of the hollow inner cavity, extends at least partly beyond the at least one hollow inner cavity, covers part of the top surface, and terminates along the top surface of the upright walls of the peripheral borders at a position overlapping the upright walls, and wherein the at least one cover sheet increases rigidity of the assembly, and absorbs shock by deforming in a plane while remaining integral with the structural part.

2. A hollow assembly of a structural part and at least one planar cover sheet, the structural part being obtained by at least one of a casting operating and a forging operation, the hollow assembly comprising:

the structural part comprising:
a longitudinally extending mass having an open cross-sectional profile, not limited to type H or U, with peripheral borders defining at least one inner hollow cavity on at least one open side surface of the mass; and
ends arranged with fixing areas;
wherein the peripheral borders consist of upright walls extending transversely from a central portion of said mass, the upright walls each having a wall thickness defining a top surface; and the at least one planar cover sheet having a profile similar to the structural part, the at least one cover sheet positioned and fixed on the top surface of the upright walls of the peripheral borders by superimposing and fixing a connection means, said at least one planar cover sheet covering part of the top surface, wherein the at least one planar cover sheet covers all or part of the at least one inner hollow cavity, in bearing contact with the top surface of the upright walls of the peripheral borders, the at least one planar cover sheet terminating along said top surface at a position overlapping the upright walls, and wherein the at least one planar cover sheet increases rigidity of the assembly, and the at least one planar cover sheet absorbs shock by deforming in a planar while remaining integral with the structural part.

3. The assembly as claimed in claim 2, wherein the structural part has an opening, and the at least one planar cover sheet has a corresponding opening.

4. The assembly as claimed in claim 2, wherein the at least one planar cover sheet is made of metallic material compatible for mechanical fixing with material of the structural part.

5. The assembly as claimed in claim 2, wherein the at least one planar cover sheet is fixed on the top surface of the upright walls of the peripheral borders of the structural part by welding, screwing, gluing, riveting, brazing, or another mechanical connection.

6. The assembly according to claim 2, wherein the structural part is configured as a vehicle part.

* * * * *